(12) United States Patent
Nagata et al.

(10) Patent No.: US 11,397,414 B2
(45) Date of Patent: Jul. 26, 2022

(54) MECHANICAL EQUIPMENT CONTROL SYSTEM, CONTROL APPARATUS FOR MECHANICAL EQUIPMENT, AND METHOD FOR CONTROLLING MECHANICAL EQUIPMENT

(71) Applicant: KABUSHIKI KAISHA YASKAWA DENKI, Kitakyushu (JP)

(72) Inventors: Takeshi Nagata, Kitakyushu (JP); Takaaki Shogaki, Kitakyushu (JP); Yasufumi Yoshiura, Kitakyushu (JP); Tadashi Okubo, Kitakyushu (JP); Kei Katsuyama, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 254 days.

(21) Appl. No.: 16/877,499

(22) Filed: May 19, 2020

(65) Prior Publication Data

US 2020/0278647 A1 Sep. 3, 2020

Related U.S. Application Data

(63) Continuation of application No. PCT/JP2018/037471, filed on Oct. 5, 2018.

(30) Foreign Application Priority Data

Nov. 28, 2017 (JP) .............................. JP2017-228442

(51) Int. Cl.
*G05B 13/00* (2006.01)
*G05B 13/04* (2006.01)
(Continued)

(52) U.S. Cl.
CPC .............. *G05B 13/042* (2013.01); *B25J 9/02* (2013.01); *B25J 9/161* (2013.01); *B25J 9/1602* (2013.01);
(Continued)

(58) Field of Classification Search
None
See application file for complete search history.

(56) References Cited

U.S. PATENT DOCUMENTS

2012/0261989 A1 10/2012 Mishina
2016/0139604 A1 5/2016 Ito
(Continued)

FOREIGN PATENT DOCUMENTS

EP 0348530 1/1990
JP 06-079590 3/1994
(Continued)

OTHER PUBLICATIONS

International Search Report for corresponding International Application No. PCT/JP2018/037471, dated Dec. 11, 2018.
(Continued)

*Primary Examiner* — Paul B Yanchus, III
(74) *Attorney, Agent, or Firm* — Mori & Ward, LLP

(57) ABSTRACT

A mechanical equipment control system includes a mechanical apparatus, a load ratio detection circuit, and an integration control circuit. The mechanical apparatus includes a motor which is configured to drive the mechanical apparatus. The load ratio detection circuit is configured to detect a load ratio of the motor. The integration control circuit is configured to control the mechanical apparatus based on an operation parameter while keeping the load ratio in an allowable load state.

19 Claims, 12 Drawing Sheets

(51) Int. Cl.
  *B25J 9/02* (2006.01)
  *B25J 9/16* (2006.01)
  *B25J 19/02* (2006.01)
  *G05B 13/02* (2006.01)
  *G06N 3/08* (2006.01)

(52) U.S. Cl.
  CPC ............. *B25J 9/163* (2013.01); *B25J 9/1669* (2013.01); *B25J 9/1697* (2013.01); *B25J 19/023* (2013.01); *G05B 13/027* (2013.01); *G06N 3/084* (2013.01)

(56) References Cited

U.S. PATENT DOCUMENTS

| | | | |
|---|---|---|---|
| 2017/0308052 A1 | 10/2017 | Kajiyama | |
| 2017/0315535 A1* | 11/2017 | Ishii | G05B 19/402 |
| 2019/0138009 A1* | 5/2019 | Saito | G05D 1/0094 |

FOREIGN PATENT DOCUMENTS

| | | |
|---|---|---|
| JP | 11-155230 | 6/1999 |
| JP | 2017-199077 | 11/2017 |
| WO | WO 97/29890 | 8/1997 |

OTHER PUBLICATIONS

Japanese Office Action for corresponding JP Application No. 2019-500898, dated Apr. 9, 2019 (w/ English machine translation).
Extended European Search Report for corresponding EP Application No. 18884520.0-1205, dated Jun. 28, 2021.

\* cited by examiner

MECHANICAL EQUIPMENT CONTROL SYSTEM, CONTROL APPARATUS FOR MECHANICAL EQUIPMENT, AND METHOD FOR CONTROLLING MECHANICAL EQUIPMENT

CROSS-REFERENCE TO RELATED APPLICATIONS

The present application is a continuation application of International Application No. PCT/JP2018/037471, filed Oct. 5, 2018, which claims priority to Japanese Patent Application No. 2017-228442, filed Nov. 28, 2017. The contents of these applications are incorporated herein by reference in their entirety.

BACKGROUND

Field of the Invention

The embodiments disclosed herein relate to a mechanical equipment control system, a control apparatus for mechanical equipment, and a method for controlling mechanical equipment.

Discussion of the Background

JP 11-155230A discloses an excessive load protection device that is for a motor control apparatus and that predicts a state close to an excessive load state so as to prevent mechanical equipment from stopping suddenly.

SUMMARY

According to one aspect of the present disclosure, a mechanical equipment control system includes a mechanical apparatus, a load ratio detection circuit, and an integration control circuit. The mechanical apparatus includes a motor which is configured to drive the mechanical apparatus. The load ratio detection circuit is configured to detect a load ratio of the motor. The integration control circuit is configured to control the mechanical apparatus based on an operation parameter while keeping the load ratio in an allowable load state.

According to another aspect of the present disclosure, a control apparatus for mechanical equipment which includes a mechanical apparatus having a motor includes a load ratio detection circuit and an integration control circuit. The load ratio detection circuit is configured to detect a load ratio of the motor which is configured to drive the mechanical apparatus. The integration control circuit is configured to control the mechanical apparatus based on an operation parameter while keeping the load ratio in an allowable load state.

According to the other aspect of the present disclosure, a method for controlling mechanical equipment including a mechanical apparatus includes inputting an operation parameter into the mechanical equipment; driving a motor of the mechanical apparatus to drive the mechanical apparatus; and controlling the mechanical apparatus based the operation parameter so that a load ratio of the motor is kept in an allowable load state.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
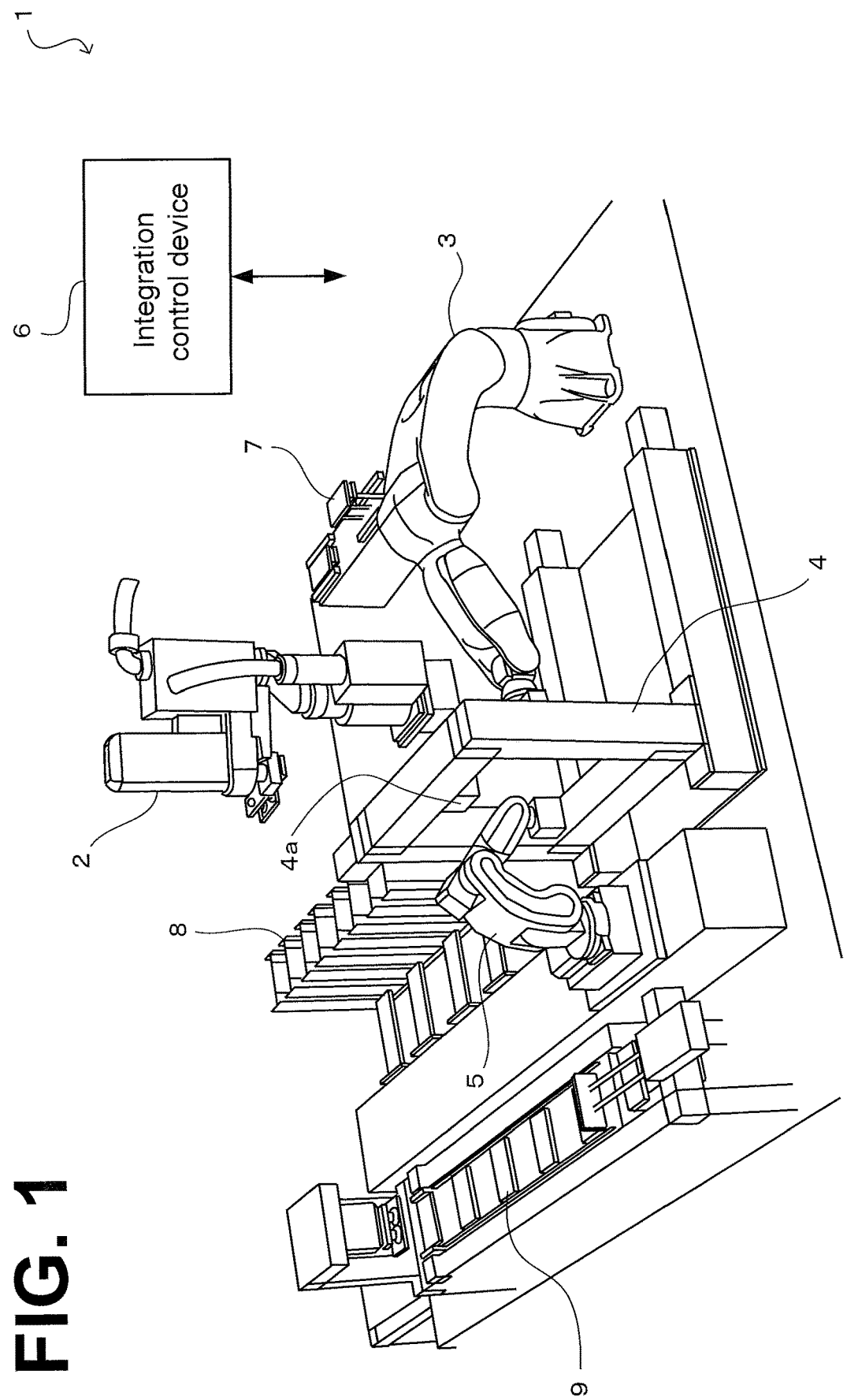
FIG. 1 is a perspective view of an exterior of a mechanical equipment control system according to an embodiment.

The embodiments will now be described with reference to the accompanying drawings, wherein like reference numerals designate corresponding or identical elements throughout the various drawings.

Figure 2:
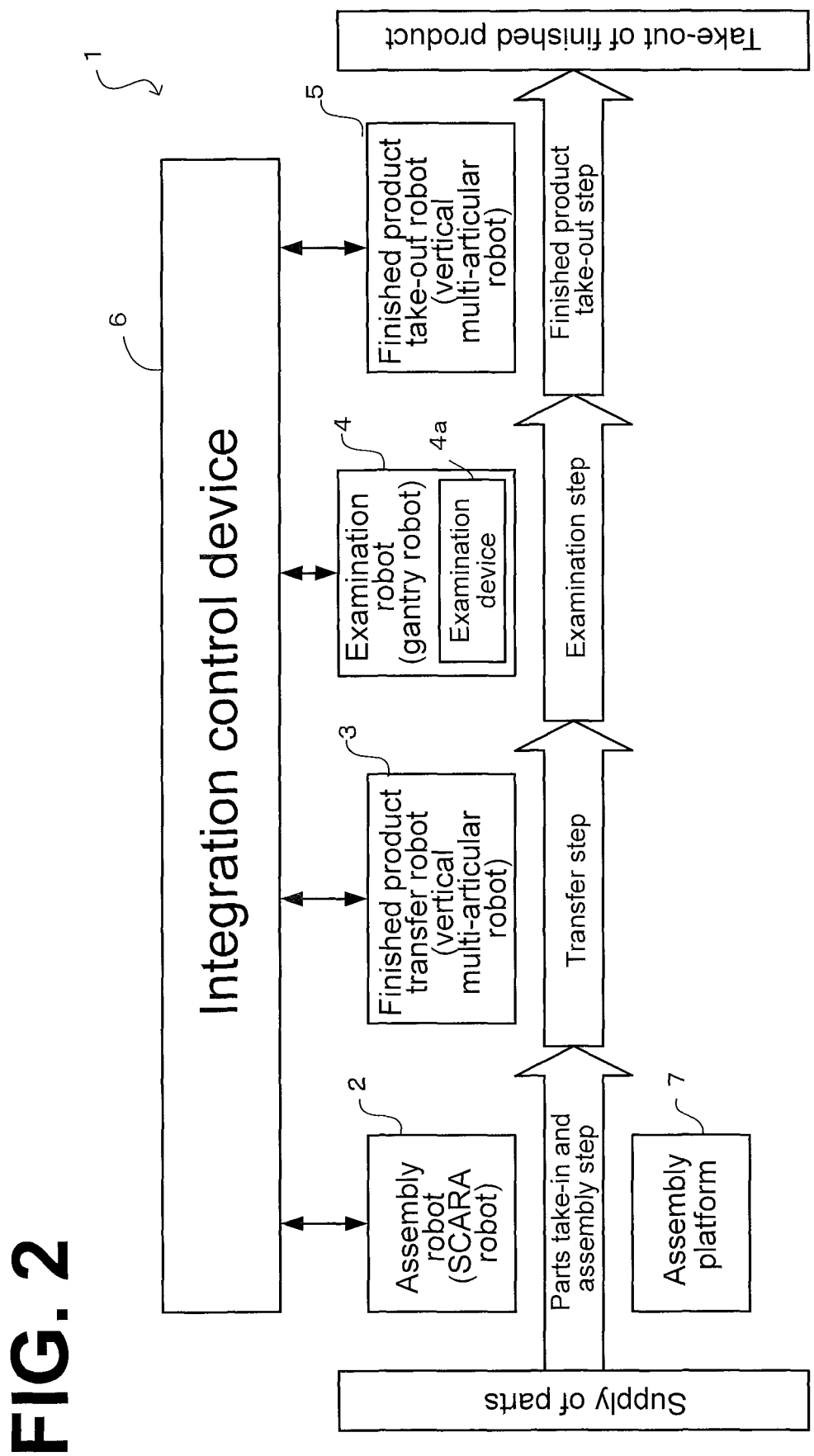
FIG. 2 is a diagram illustrating: a schematic system configuration of the mechanical equipment control system; and an example flow of a work process performed by the mechanical equipment control system.

1: Schematic System Configuration of Mechanical Equipment Control System and Work Process FIG. 1 is a perspective view of an exterior of a mechanical equipment control system according to this embodiment. FIG. 2 is a diagram illustrating: a schematic system configuration of the mechanical equipment control system; and an example flow of a work process performed by the mechanical equipment control system. The mechanical equipment control system exemplified in this embodiment is a system for controlling a mechanical equipment that performs work including: examining a finished product of an assembly of a large number of parts that have been supplied; and taking out the finished product. Referring to FIGS. 1 and 2, a mechanical equipment control system 1 includes an assembly robot 2, a finished product transfer robot 3, an examination robot 4, a finished product take-out robot 5, and an integration control device (an integration control circuit) 6.

The assembly robot 2 is a robot that performs work including: holding a large number of parts each supplied to a predetermined carry-in position 8; placing the parts on an assembly platform 7; and assembling the parts. In this example, the assembly robot 2 is implemented by a "SCARA robot" (horizontal multi-articular robot).

The finished product transfer robot 3 is a robot that performs work including: holding a finished product assembled by the assembly robot 2; transferring the finished product from the assembly platform 7 into an examination space of the examination robot 4, described later; and supporting the finished product. In this example, the finished product transfer robot 3 is implemented by a "vertical articulated robot" (vertical multi-articular robot).

The examination robot 4 is a robot that includes an examination device 4a, which uses an optical sensor, and that performs work including moving the optical sensor to make the optical sensor detect states of the elements of the finished product supported in the examination space by the finished product transfer robot 3. In this example, the examination robot 4 is implemented by a "gantry" (gantry robot). It is to be noted that an example of how the examination device 4a examines an assembly state of the finished product is to perform image recognition of an exterior image of the finished product taken by a camera, which serves as the optical sensor.

The finished product take-out robot 5 is a robot that performs work including: receiving, from the finished product transfer robot 3, the finished product done with the examination work performed by the examination robot 4; and transferring the finished product to a predetermined take-out place 9. In this example, the finished product take-out robot 5 is implemented by a "vertical articulated robot" (vertical multi-articular robot).

The integration control device 6 has functions including transmitting and receiving various kinds of information such as detection information and a control command to and from the above-described robots so as to perform synchronization control of making the robots work cooperatively so that the work process in the mechanical equipment control system 1 as a whole proceeds smoothly. In this example, the integration control device 6 is implemented by a general-purpose computer equipped with elements such as CPU, ROM, RAM, and HDD.

It is to be noted that in the above-described configuration, the assembly robot 2, the finished product transfer robot 3, the examination robot 4, and the finished product take-out robot 5 correspond to the mechanical apparatus recited in the appended claims; a combination of configurations of these robots corresponds to the mechanical equipment recited in the appended claims; and the integration control device 6, which controls the mechanical equipment as a whole, corresponds to the integration control device and the mechanical equipment control apparatus recited in the appended claims. It is also to be noted that the mechanical equipment may include various other mechanical apparatuses than the above-described robots, examples including: a transfer apparatus such as a belt conveyor; a machining apparatus; and a test apparatus, which are not illustrated. It is also to be noted that the integration control device 6 may perform integration control of all these mechanical apparatuses.

Figure 3:
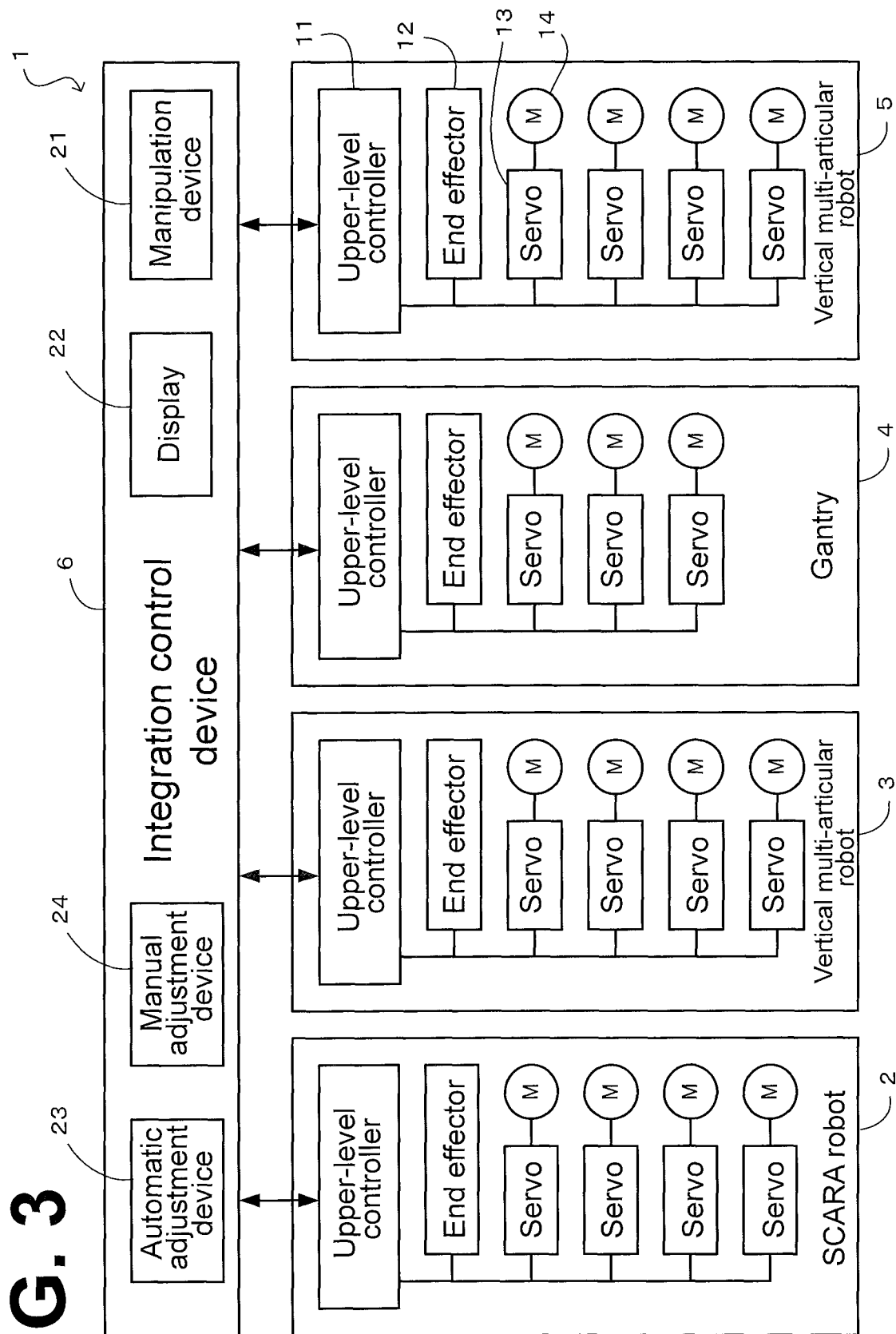
FIG. 3 is a diagram illustrating an example control functional block configuration of the mechanical equipment control system.

2: Schematic Hardware Control Configuration and Processing Details of Mechanical Equipment Control System FIG. 3 is a diagram illustrating an example control functional block configuration of the mechanical equipment control system 1. It is to be noted that FIG. 3 only illustrates a control configuration of each of the robots associated with actuator control; for example, the examination device 4a of the examination robot 4 is not illustrated. Referring to FIG. 3, the robots 2 to 5 each include an upper-level controller 11, an end effector 12, a servo amplifier 13, and a motor 14.

Based on a work command (described later) input from the integration control device 6, the upper-level controller 11 outputs a control command specifying a position, a speed, or a torque (thrust) to be employed by a plurality of motors 14 provided in the robot. This control command also specifies a motion for the end effector 12 to make. For example, the upper-level controller 11 calculates a target position, a target movement path, and a target movement speed for the end effector 12 to employ in order to cause the robot to make a predetermined motion corresponding to the above-described work command; successively calculates, by operations, a target output position, a target output speed, a target output torque (thrust), and/or other parameters of the motors 14 necessary for moving the end effector 12 at the target position, the target movement path, and the target movement speed; and outputs these parameters as control commands to the servo amplifiers 13 of corresponding motors 14. The calculation, by operations, of the parameters such as the target output position, the target output speed, and the target output torque (thrust) may be performed based on "inverse kinematics operations", which are known in the art and will not be elaborated upon here.

Based on a control command input from the upper-level controller 11, the servo amplifier 13 (motor controller, simply termed as "servo" in the drawings) performs feeding control of driving power used to drivingly control the corresponding motor 14. It is to be noted that an internal configuration of and processing performed by the servo amplifier 13 according to this embodiment will be detailed later.

Any of various types of motors may be applied to the motor 14, examples including a rotary motor and a linear motion motor. It is to be noted that the number of servo amplifiers 13 and motors 14 provided in each of the robots (mechanical apparatuses) will not be limited to the example illustrated; any other number of servo amplifiers 13 and motors 14 may be provided in each of the robots. It is also to be noted that the servo amplifier 13 and the motor 14 may not necessarily be provided in the one-to-one correspondence illustrated in the drawings; another possible configuration is that a single servo amplifier 13 controls a plurality of motors 14.

The integration control device 6 includes: a manipulation device 21 (input receiver), which is implemented by a keyboard, a pointing device, or a touch panel and which receives various input operations from an administrator (user); and a display 22 (load ratio display), which is implemented by elements such as a display and which displays various commands and information for the administrator. The integration control device 6 also includes an automatic adjustment device (an automatic adjustment circuit) 23 and a manual adjustment device (a manual adjustment circuit) 24, which are functional elements implemented in the form of software.

The integration control device 6 enables the mechanical equipment to accomplish its whole purpose, namely, an operation task (whole work including the steps of: carrying parts in; assembling the parts; transferring a finished product; examining the finished product; and taking out the finished product). For this purpose, the integration control device 6 manages time-series sequences of operation states of the robots (this sequence will be hereinafter referred to as operation sequence; see FIG. 6, described later), and outputs a work command at a suitable timing. The work command includes: a work-associated motion pattern of the robot into which the work command is input; and a load ratio (described later) of each of the motors 14 necessary for implementing the motion pattern.

The automatic adjustment device 23 and the manual adjustment device 24 each have a function of, based on a setting input of an operation parameter (described later), adjusting the operation sequence of each robot and/or details of the work command output to each robot (such as motion pattern and load ratio of each motor 14). The automatic adjustment device 23 is a functional element that enables the integration control device 6 itself to make automatic adjustments, and the manual adjustment device 24 is a functional element that enables the administrator himself/herself to make manual adjustments. It is to be noted that details of the processing performed by the automatic adjustment device 23 and the manual adjustment device 24 will be detailed later.

3: Features of this Embodiment

Factory automation represented by the mechanical equipment described above is implemented by a mechanical equipment including a plurality of mechanical apparatuses (such as robots) each drivingly controlled by a motor 14, which serves as a drive axis. Such mechanical equipment has various operation parameters to be considered, such as power consumed in the entire equipment and equipment lifetime. In production equipment such as the equipment according to this embodiment, examples of operation parameters to be considered include operation-associated parameters such as production speed (tact time) of a product and quality (yield) of a product.

Some of these various operation parameters may have a particular relationship with each other. For example, consumption power and tact time have a negative relationship, that is, a trade-off relationship in which increasing one decreases the other. Generally, mechanical equipment as a whole is initially designed with a balance between the various operation parameters taken into consideration, and is controlled based on the design. In order to give priority to reliable accomplishment of a task, mechanical equipment is, in many cases, designed and produced with some degree of allowance (margin) left in the functional potential (such as degree of motion freedom, and capacity and durability of each motor 14) of each single mechanical apparatus.

There is, however, such a situation that the administrator wishes to intentionally give priority to and increase a particular operation parameter at the expense of the other operation parameters (for example, the administrator may wish to increase the tact time even though it increases power consumption). Thus, there has been a need for such control that, while ensuring that an intended operation task is accomplished, maximizes the functional potential (function resources) of the mechanical equipment as a whole by giving priority to a particular operation parameter.

Under the circumstances, this embodiment includes a load ratio detector (described later) that detects load ratios of all the motors 14; the manipulation device 21, which receives a setting input of a predetermined operation parameter of the mechanical equipment control system 1; and the integration control device 6, which controls the plurality of mechanical apparatuses (robots) based on the setting input of the predetermined operation parameter while keeping load ratios of all the motors 14 at an allowable load state.

In this configuration, the integration control device 6 keeps the load ratios of all the motors 14 of the mechanical equipment in an allowable load state. This enables the integration control device 6 to, while keeping an operation task of the mechanical equipment as a whole at an accomplished state, control the robots by performing an inter-robot operation sequence adjustment and/or an inter-robot load-ratio assignment adjustment that are suitable for the setting input of the predetermined operation parameter. A configuration and a way of implementing these functions will be described below.

4: Detailed Configuration of Servo Amplifier and Load Ratio

First, the load ratio of each motor 14 in this embodiment will be described. For example, the load ratio may be a ratio of an instantaneous current that is being fed to the motor 14 at a point of time relative to a rated current of the motor 14. In this embodiment, however, a motion margin is employed as the load ratio. As described below, the motion margin is calculated by obtaining a ratio of a motion state value relative to a motion rated value that is obtained by taking into consideration a motion state and an environment state of the motor 14 and the corresponding servo amplifier 13 at a point of time.

Figure 4:
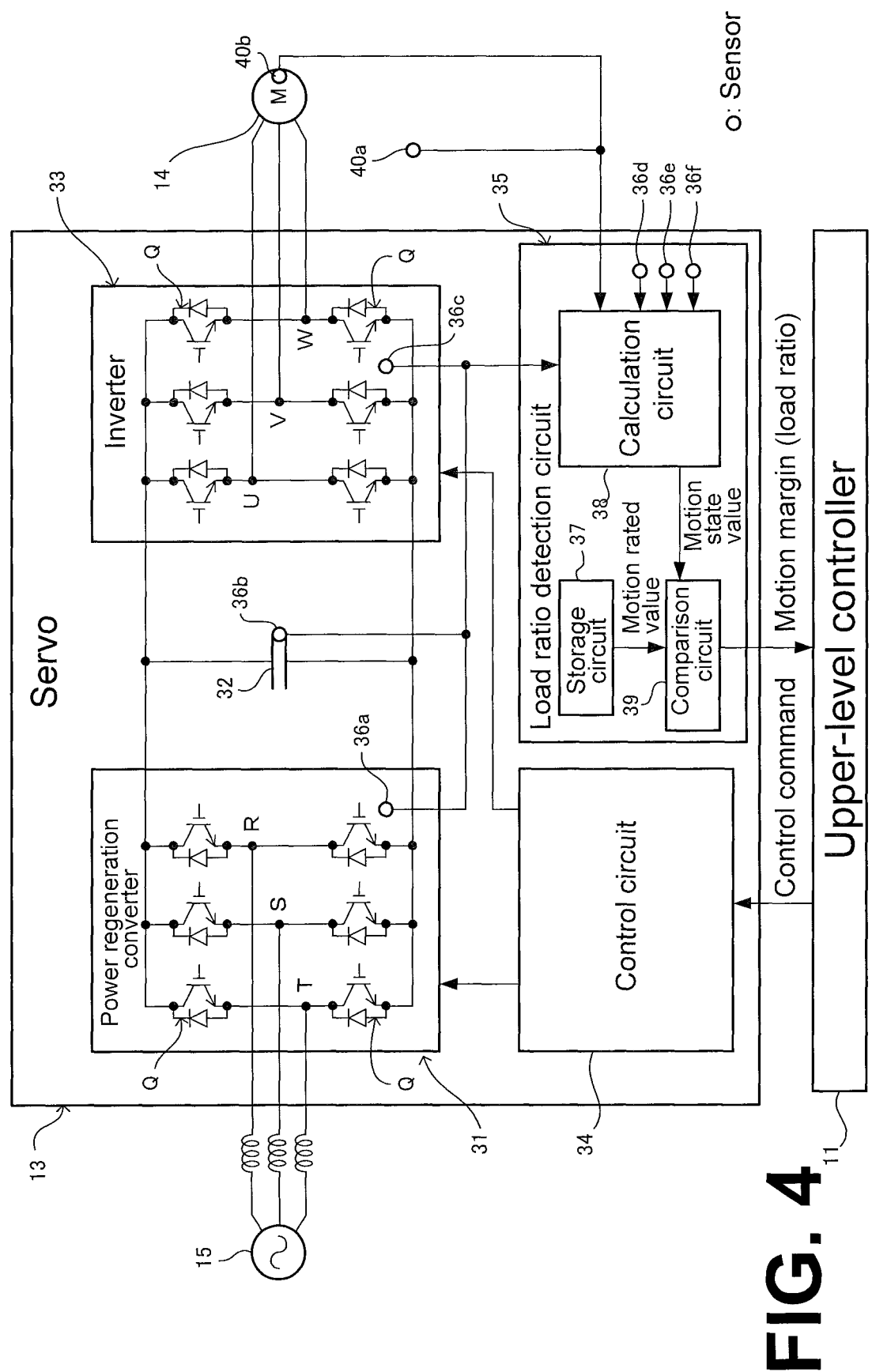
FIG. 4 is a functional block diagram of: a servo amplifier that detects a motion margin as a load ratio; and elements located around the servo amplifier.

FIG. 4 is a functional block diagram of: the servo amplifier 13, which detects a motion margin as the load ratio; and elements located around the servo amplifier 13. As illustrated in FIG. 4, the servo amplifier 13 includes a converter 31, a smoothing capacitor 32, an inverter 33, a control circuit 34, a load ratio detection circuit 35, and various internal sensors 36.

The converter 31 is connected to a three-phase AC power source 15, which is a commercial power source, and has a function of: converting AC power supplied from the three-phase AC power source 15 into DC power; and feeding the DC power to a DC bus line.

The smoothing capacitor 32 is provided across and connected to DC bus lines, and smoothens DC power that has been full-wave rectified by the converter 31.

The inverter 33 is connected to the motor 14, and has a function of PWM converting the DC power supplied from the DC bus line into driving power equivalent to three-phase AC having a predetermined amplitude and a predetermined frequency; and feeding driving power to the motor 14.

The control circuit 34 is implemented by a computer made up of CPU, ROM, RAM, and other elements; generates ON/OFF control signals for arm switching elements Q of the converter 31 and the inverter 33 based on a control command input from the upper-level controller 11; and outputs the ON/OFF control signals.

The load ratio detection circuit 35 is a processor that outputs, based on environment state data (described later), a motion margin (load ratio) of a motion state value relative to a motion rated value of at least one of the servo amplifier 13 and the motor 14. The load ratio detection circuit 35 includes a storage 37, a calculation circuit 38, and a comparison circuit 39. The storage 37 is a storage for storing a motion rated value that has been calculated in advance and that corresponds to the servo amplifier 13 and the motor 14 to which the servo amplifier 13 is connected. The calculation circuit 38 is an operator that calculates a motion state value based on various kinds of environment state data detected at the internal sensors 36 and/or external sensors 40. The comparison circuit 39 is an operator that makes a comparison between the motion rated value stored in the storage 37 and the motion state value calculated by the calculation circuit 38, that calculates a motion margin based on the comparison, and that outputs the motion margin to the upper-level controller 11.

This embodiment includes sensors to detect various kinds of environment state data to be input into the calculation circuit 38 of the load ratio detection circuit 35, namely: the internal sensors 36, which are provided in the servo amplifier 13 itself; and the external sensors 40, which are provided outside the servo amplifier 13. In the example illustrated, the internal sensors 36 include a converter temperature sensor 36a, a smoothing capacitor temperature sensor 36b, an inverter temperature sensor 36c, an in-apparatus atmosphere temperature sensor 36d, a humidity sensor 36e, and a vibration sensor 36f. The external sensors 40 include an external air temperature sensor 40a and a motor temperature sensor 40b. It is to be noted that the internal sensors 36 and the external sensors 40 correspond to the state quantity detector recited in the appended claims.

In this embodiment, a combination of rated values of a plurality of pieces of motion state data (such as output power, current, voltage, loss, speed, torque (thrust)) is regarded as a motion rated value, and a combination of a plurality of pieces of motion state data is regarded as a motion state value. Based on environment state data detected at a point of time, the load ratio detection circuit 35 calculates a motion margin serving as an indicator of the degree of equipment usage condition indicated by the motion state value at the point of time, as compared with the motion rated value necessary for keeping the servo amplifier 13 and the motor 14 at a normal state. Then, the load ratio detection circuit 35 outputs the motion margin as the load ratio according to this embodiment.

The motion rated value is a value that is set in advance on the manufacturer side as an index value to ensure a normal state of at least one of the servo amplifier 13 and the motor 14, and that is stored in the above-described storage. The motion state value, which is successively calculated by the calculation circuit 38, is a value that indicates, by a scale of measurement identical to that used for the motion rated value, how much load is being applied to the servo amplifier 13 and the motor 14 at the time at which state data is detected. Then, the comparer calculates the motion margin (load ratio) by calculating a ratio of the motion state value relative to the motion rated value (=motion state value/motion rated value). When the motion state value is equal to or less than the motion rated value (load ratio=motion margin≤100%), a determination is made that the normal state of the servo amplifier 13 and the motor 14 that are in motion state is maintained. When the motion state value is in excess of the motion rated value (load ratio=motion margin>100%), a determination is made that the normal state of the servo amplifier 13 and the motor 14 that are in motion state is not secured (a determination is made that there is a possibility of an abnormality). Further details about how to calculate the motion rated value, the motion state value, and the motion margin are described in JP 2017-061711A and will not be elaborated upon here. It is to be noted that the motion state data and the environment state data correspond to the state quantity (state value).

5: Monitoring of Load Ratio and Setting Input of Operation Parameter

Figure 5:
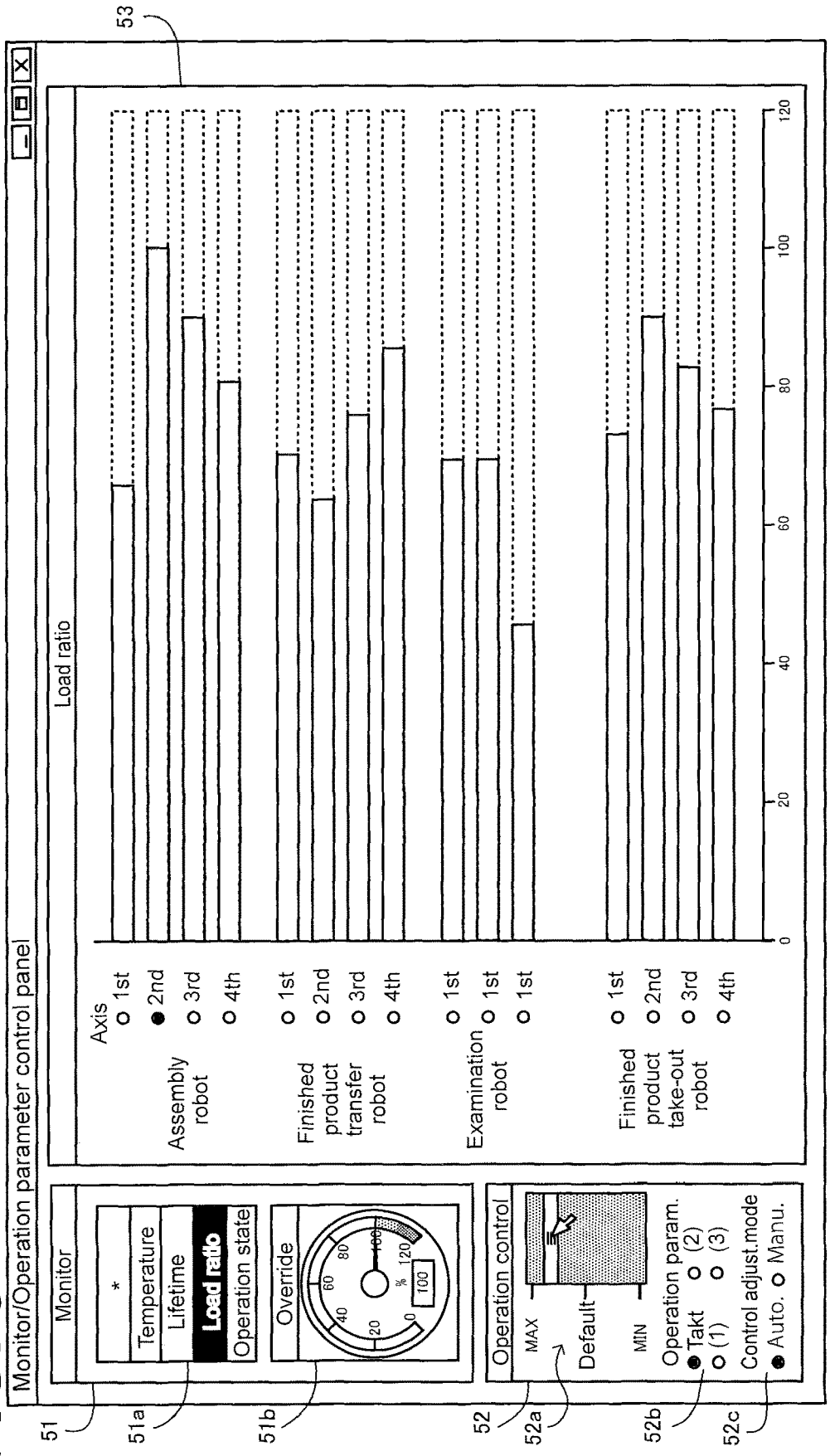
FIG. 5 illustrates an example image of a load ratio monitor and an operation parameter control panel.

As has been described hereinbefore, the load ratio calculated in the form of a motion margin can be referred to as a single index value indicating the degree to which inherent function resources of the servo amplifier 13 and the corresponding motor 14 are being exerted. The integration control device 6 according to this embodiment is capable of: receiving, via the upper-level controllers 11 of the robots, load ratios detected at all the motors 14; and displaying the load ratios on the display 22. FIG. 5 illustrates an example image of a load ratio monitor and an operation parameter control panel displayed by "GUI (Graphic User Interface)" on the display 22 of the integration control device 6. Referring to FIG. 5, a monitor window 51 is displayed in an upper left area of the display screen; an operation control window 52 is displayed below the monitor window 51; and a load ratio monitor window 53 is displayed in a right area of the display screen.

The monitor window 51 includes: a monitor content display area 51a, which shows content displayed on the monitor (in the example illustrated, the content includes "Abnormality prediction", "Temperature", "Lifetime", "Load ratio monitor", and "Operation state monitor"); and an override display area 51b, which shows in detail an override situation about the load ratio of the motor 14 that has been selected. The illustrated example is a state in which a selection operation has been made to monitor the Load ratio monitor in the monitor content display area 51a. As a result of the selection operation, the load ratio monitor window 53 for the motors 14 is displayed in the right-side display area. The Load ratio monitor displays a list of bar graphs of load ratios detected by all the motors 14 of the four robots provided in the mechanical equipment in comparison with uniformly normalized lengths of motion rated values (see dotted portions in the drawing). Among the load ratios, the load ratio of one motor 14 (in the example illustrated, the second axis of the assembly robot 2) is arbitrarily selected by the administrator, and the override situation of the selected load ratio is displayed in the override display area 51b. These display items are updated at time intervals at which the load ratios of the motors 14 are received. By monitor-displaying the load ratios in this manner, the degree of the load ratio of each motor 14, that is, how much of the integral functional potential of the motors 14 is exerted in the mechanical equipment as a whole can be checked in a real-time manner.

The operation control window 52 includes: an operation parameter setting operation area 52a, which is for a manual setting operation of an operation parameter; a target operation parameter selection operation area 52b, which is for a selection operation of the kind of operation parameter targeted for setting input (in the example illustrated, kinds of operation parameter include "Takt", "Power consumed", "Yield", and "Life extension driving"); and a mode switching operation area 52c, which is for a switching operation of whether a control adjustment, described later, is performed in automatic adjustment mode or manual adjustment mode. The illustrated example is a state in which: a selection operation has been made to select the Tact time as the target operation parameter; the control adjustment is switched to the automatic adjustment mode; and a cursor operation has been made by the administrator to set the slide bar in the operation parameter setting operation area 52a at a position above the default position at the center toward the MAX position. By this setting input, the integration control device 6 automatically performs a control adjustment of giving priority to the Tact time operation parameter and raising the Tact time from the default to a state closer to the maximum (MAX). By this operation control, the integration control device 6 is able to adjust work commands output to the robots so that the mechanical equipment, while keeping the intended operation task at an accomplished state, realizes the content of the target operation parameter arbitrarily set by the administrator.

It is to be noted that the kinds of operation parameters targeted for setting input include: "Takt", which is an operation parameter for adjusting the production speed at which the mechanical equipment produces products; "Power consumed", which is an operation parameter for adjusting the power consumed in the mechanical equipment as a whole at the time of production; "Yield", which is an operation parameter for adjusting the quality of products produced by the mechanical equipment; and "Life extension driving", which is an operation parameter for adjusting the lifetime and/or durability of the mechanical equipment (the mechanical apparatuses, such as the robots, and parts of the mechanical apparatuses) at the time of production.

6: Control Adjustment

Description will be made with regard to the control adjustment according to the above-described embodiment; specifically, description will be made with regard to how to adjust the work command that the integration control device 6 outputs to the upper-level controller 11 of each robot. First, a condition for the mechanical equipment to keep an operation task at an accomplished state is to keep the load ratios of all the motors 14 and all the servo amplifiers 13 provided in the robots (mechanical apparatuses) at an allowable load state; specifically, to keep the above-described motion state value at equal to or less than the motion rated value (motion margin=load ratio≤100%).

In this embodiment, there are mainly two methods to realize setting changes made to operation parameters while satisfying the above condition: a method by which the operation sequence of each robot is adjusted; and a method by which the content of the work command output to each robot is adjusted. In each of the two adjustment methods, two adjustment modes are available: automatic adjustment mode performed by the automatic adjustment device 23; and manual adjustment mode performed by the administrator via the manual adjustment device 24. In the automatic adjustment mode, in particular, two forms are available: a form in which an automatic adjustment is made based on a mathematical model; and a form in which an automatic adjustment is made by machine learning.

7: Manual Adjustment Mode

7-1: Manual Adjustment Mode of Operation Sequence

Figure 6:
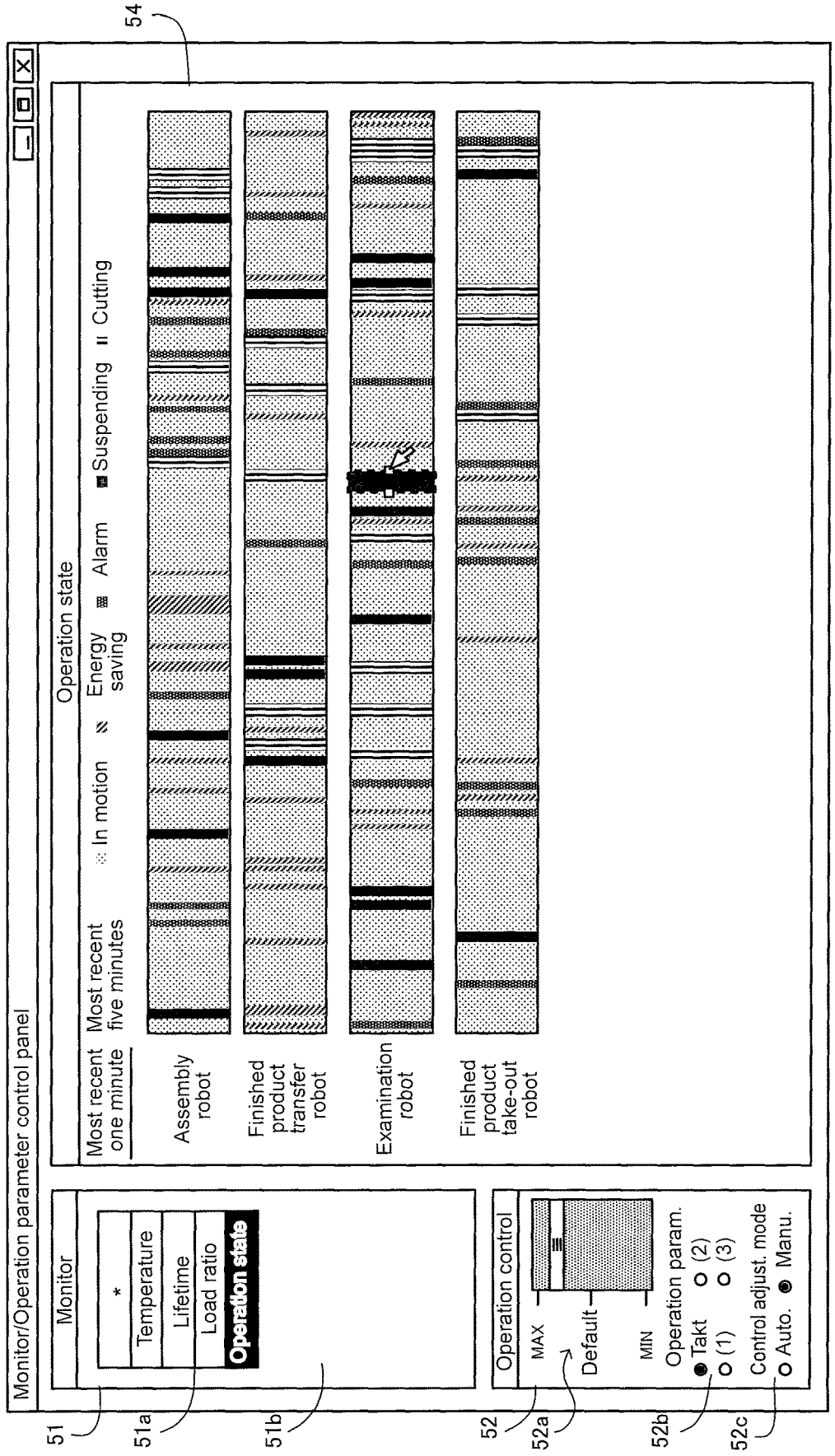
FIG. 6 illustrates an example image of an operation state monitor.

FIG. 6 illustrates an example image of an operation state monitor corresponding to FIG. 5. Referring to FIG. 6, an operation state monitor window 54 is displayed in the right-side area. In the example illustrated, a time-series sequence, that is, an operation sequence of operation states of each robot is displayed on the operation state monitor window 54. The operation sequence corresponds to the most recent one-minute time length from the time at which the operation state monitor window 54 was displayed. In the operation sequence displayed, the operation states of the corresponding robot (in the example illustrated, "In motion", "Energy saving", "Alarm", "Suspending", and "Cutting") are distinguished from each other using colored patterns and arranged on a time-series basis. As seen from FIG. 6, the robots are not necessarily in motion state all the time while the mechanical equipment is in operation. In actual situations, such time lengths frequently occur that the robots are in such operation states as energy saving, suspending, and cutting, which is because of the necessity of synchronizing cooperation work performed by the robots.

When, for example, there is a need for increasing the Tact time operation parameter, it is effective to adjust the operation sequence of each robot by shortening the time lengths for the energy-saving operation state, the suspending operation state, and the cutting operation state. For this purpose, it is possible to perform setting input processing at the manual adjustment device 24 to, as illustrated in the drawing: make a manual adjustment (not illustrated) of the time length for an arbitrary operation state by a cursor operation; or make a manual adjustment (not illustrated) to shorten the time length for the operation sequence as a whole of all the robots. In this respect, the manual adjustment device 24 restricts the degree by which each of the adjustment operations can be made while ensuring that the load ratios of all the motors 14 are kept at an allowable load state. This configuration ensures that the above-described condition for the mechanical equipment to accomplish an operation task is satisfied. Also, when a particular operation state affects the setting content of an operation parameter, it is possible to highlight the time length for the operation state by, for example, making the time length flash intermittently. This ensures that the position of the time length for the operation state that needs adjusting is clearly visually recognizable.

7-2: Manual Adjustment Mode of Work Command

When the end effector 12 of, for example, a vertical articulated robot is moved to a movement destination position, necessary load ratios of the motors 14 and/or the time to reach the movement destination position may vary depending on the movement path taken so far and/or the arrangement of the arm joints taken during the movement, even if the end effector 12 is moved to the same movement destination position. Under the circumstances, in order to make an adjustment to assign load ratio among the motors 14 (load assignment), it is effective to, while maintaining the work of movement to the same movement destination position, manually adjust robot motion patterns and/or manually adjust the load ratio of each motor 14 itself. For this purpose, it is possible to, via a setting input processing at the manual adjustment device 24, perform an operation of manually adjusting a motion pattern on an editor screen, not illustrated. In this respect, the manual adjustment device 24 restricts the degree by which each of the adjustment operations can be made while ensuring that the load ratios of all the motors 14 are kept at an allowable load state. This configuration ensures that the above-described condition for the mechanical equipment to accomplish an operation task is satisfied. Also, when a particular motion pattern affects the setting content of an operation parameter, it is possible to highlight the motion pattern by, for example, making the motion pattern flash intermittently. This ensures that the position of the time length for an operation state that needs adjusting is clearly visually recognizable.

8: Automatic Adjustment Mode

The automatic adjustment device 23 of the integration control device 6 may, basically, make an automatic adjustment in the above-described operation sequence adjustment method or work command adjustment method. When, as to form, the adjustment is based on a mathematical model, it is possible to prepare in advance a software program that, while keeping the load ratios of all the motors 14 at an allowable load state, adjusts the time length for an operation state and/or a driving pattern based on a setting input of an operation parameter. Example mathematical models that may be employed include sequence models such as in kinematics of each robot (such as forward kinematics and inverse kinematics), system transfer function, and a ladder program.

When, as to form, the adjustment is based on machine learning, it is possible to, while keeping the load ratios of all the motors 14 at an allowable load state, perform machine learning of, as a feature quantity, a correlation of a setting input of an operation parameter with an arrangement pattern of operation state time lengths or a driving pattern of each robot.

8-1: Automatic Adjustment of Operation Sequence

Figure 7:
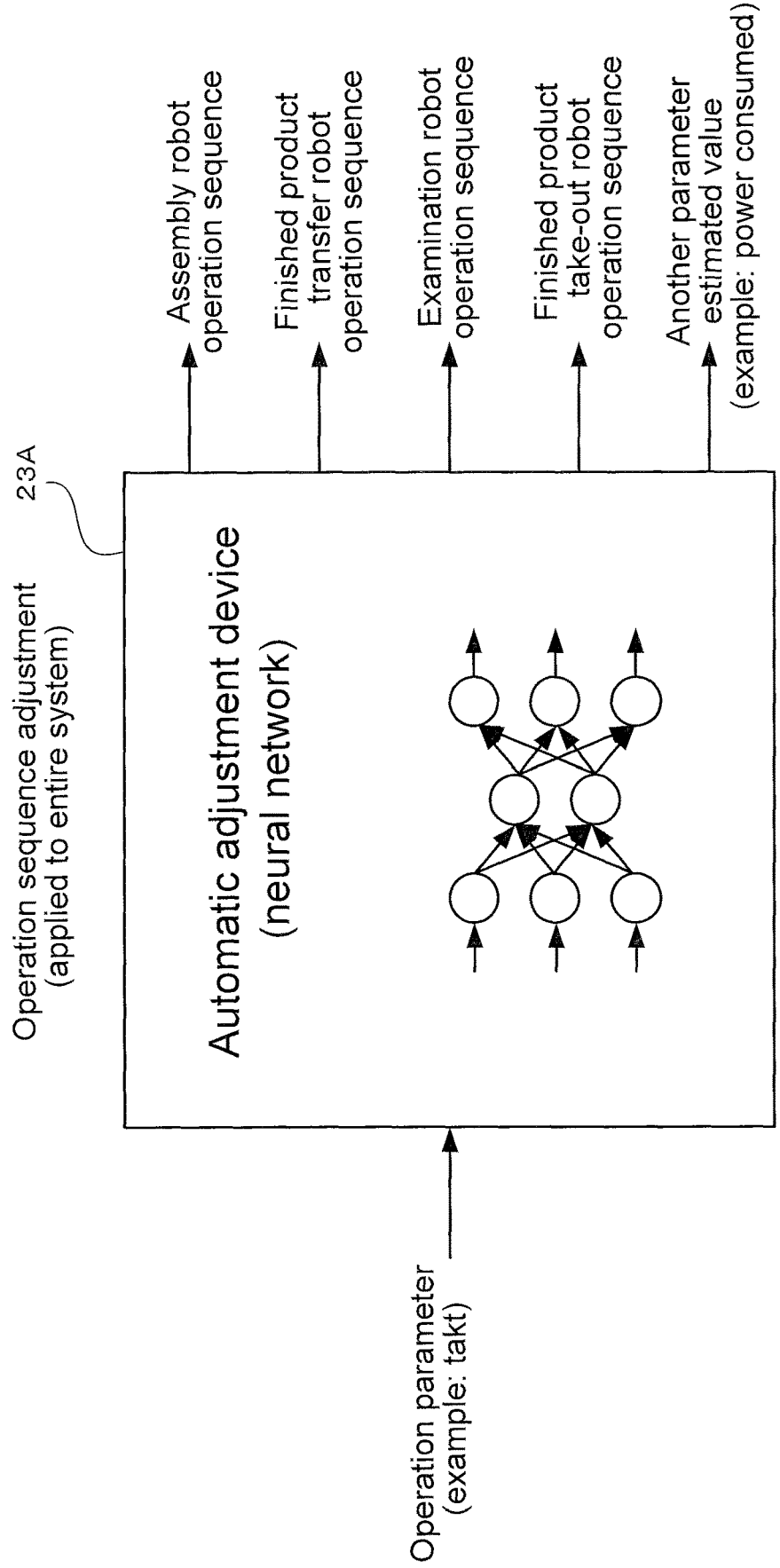
FIG. 7 is an example conceptual model configuration of an automatic adjustment device that adjusts an operation sequence based on a learning content obtained by deep learning using a neural network.

FIG. 7 illustrates an example conceptual model configuration of the automatic adjustment device 23A, which adjusts an operation sequence based on a learning content obtained by deep learning using a neural network. In the example illustrated, the automatic adjustment device 23A is designed and adapted to, in response to a setting input of an operation parameter, output a time-series pattern of the operation state time length of each robot. The time-series arrangement pattern (that is, operation sequence) of each operation state time length to be output is based on a learning content obtained in a machine learning process (deep learning), and is prepared under the assumption that the operation parameter that has been input is implementable while keeping the load ratios of all the motors 14 at an allowable load state. That is, the neural network of the automatic adjustment device 23A learns a feature quantity indicating a correlation between an operation parameter value and the operation sequence of each robot. It is to be noted that as in the example illustrated, it is possible to make the automatic adjustment device 23A learn to output an estimated value of another operation parameter.

A method suitable for learning by the neural network is "deep reinforcement learning". In this case, an operation parameter is set at a random value, and an operation is implemented according to the operation sequences of operation state time lengths that have been randomly set while keeping the load ratios of all the motors 14 at an allowable load state. Then, an error rate (evaluation value) of the operation relative to the operation parameter is detected. Then, back-propagation processing (error back-propagation processing) is performed in the neural network in order to reduce the error rate (maximize a reward based on the evaluation value in the future). The learning work is repeated while operation parameter randomness is adjusted on a convenient timing basis. This enables the neural network of the automatic adjustment device 23 to learn an operation parameter value and a feature quantity for outputting an operation sequence suitable for the operation parameter value. This kind of reinforcement learning may be performed using, for example, a known "Q-learning algorithm", which will not be elaborated upon here. It is to be noted that in order to improve processing accuracy of the learning work, it is possible to use other various known learning methods than back-propagation, examples including stacked auto-encoder, dropout, noise addition, and sparse regularization.

8-2: Specific Example of Automatic Adjustment of Operation Sequence

Figure 8:
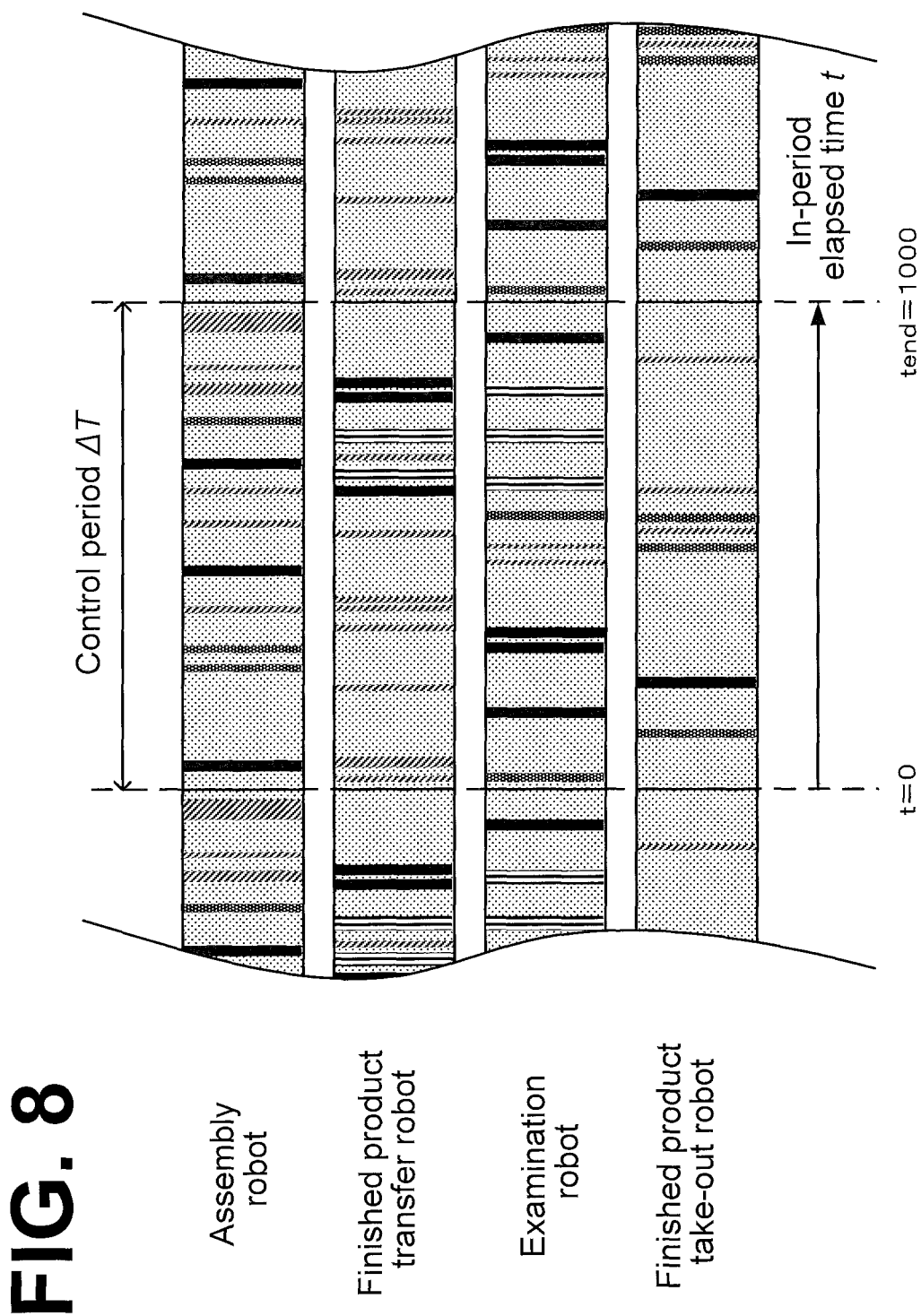
FIG. 8 illustrates an operation sequence executed periodically.

The automatic adjustment device 23A, which adjusts operation sequences, is illustrated in FIG. 7 in the form of a schematic representation of input and output of information. There are, however, a variety of possible configurations in which the automatic adjustment device 23A can be embodied. For example, an operation sequence in production equipment is in many cases implemented in the manner illustrated in FIG. 8; specifically, a time-series arrangement pattern of an operation state time length defined within a control period $\Delta T$, which has a predetermined length, is repeated periodically. In light of this, a predetermined elapse of time within the control period $\Delta T$, which is a standard control period, may be defined as in-period elapsed time t (in the example illustrated, t=0 to 1000). Then, every time the in-period elapsed time t in the operation sequence is measured, the automatic adjustment device 23 may estimate and output a suitable operation state of each robot.

Figure 9:
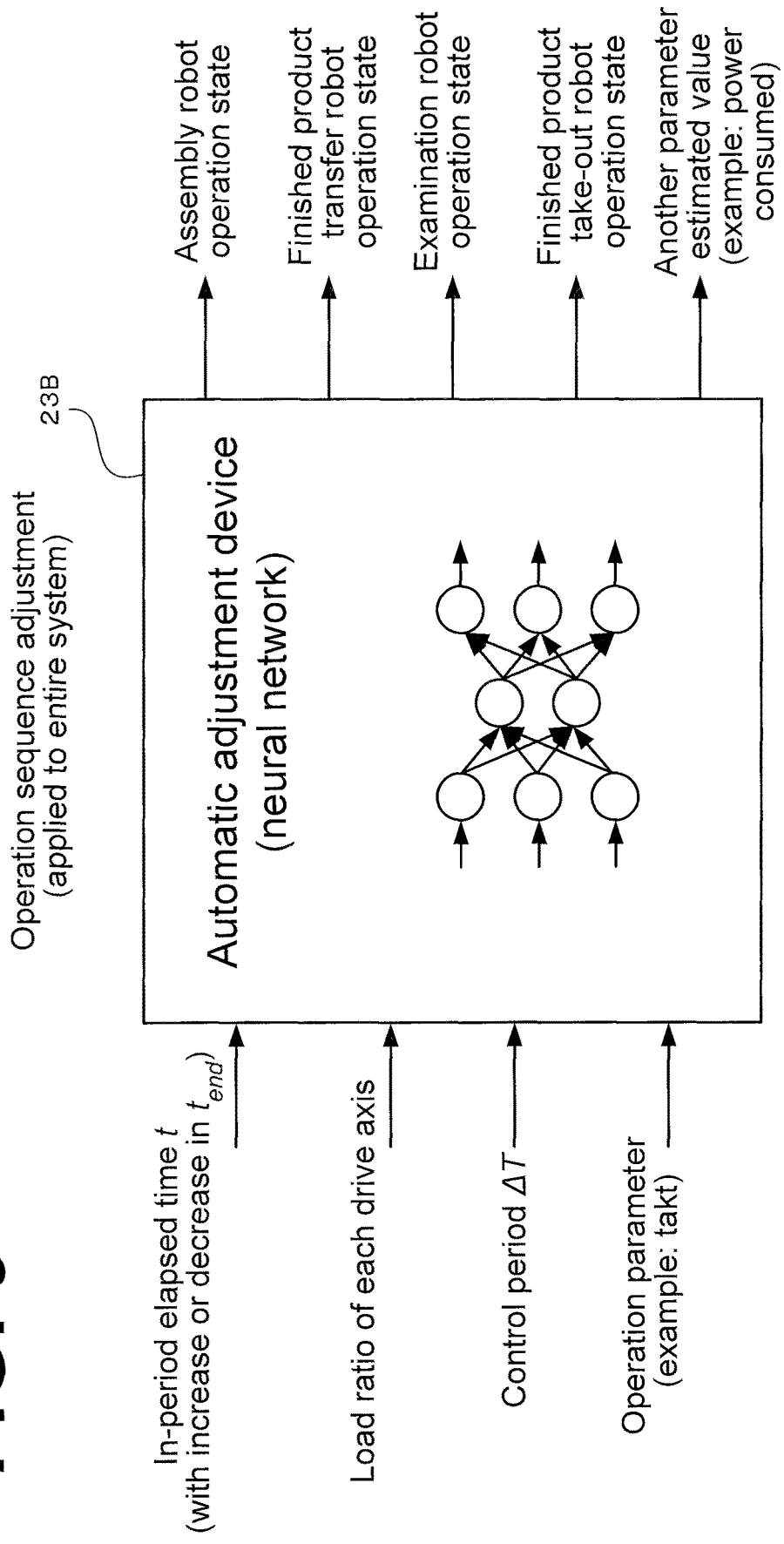
FIG. 9 illustrates an example model configuration of an automatic adjustment device that adjusts the operation sequence executed periodically.

A specific example model configuration of an automatic adjustment device 23B in this case is illustrated in FIG. 9. In the example illustrated, the automatic adjustment device 23B is designed and adjusted to, based on the in-period elapsed time t and an operation parameter that have been input at a point of time, output an operation state of each robot estimated as suitable for this in-period elapsed time t. Specifically, the neural network of the automatic adjustment device 23B learns a feature quantity indicating a correlation of the in-period elapsed time t and the operation parameter value at the point of time with the operation sequence of each robot. The output of an operation state may be either binary clustering output or multi-valued regression output. A time-series arrangement pattern of operation states output in this manner corresponds to the operation sequences illustrated in FIG. 7.

It is to be noted that the load ratio of each motor reflects various kinds of motion state data and environment state data detected by the motor 14 and the servo amplifier 13 at the present point of time, and therefore that by inputting the load ratios of the motors 14 into the automatic adjustment device 23B so that the load ratios are reflected in the estimation of the operation states of the robots, a real-time output improved in estimation accuracy can be made. It is also to be noted that when a particular operation parameter is selected, such as in adjustment control of takt, the maximum time, $t_{end}$, of the in-period elapsed time t may increase or decrease (that is, the time length of the control period $\Delta T$ as a whole may increase or decrease). In this case, the upper-level controller 11 may calculate a maximum time $t_{end}$ (the control period $\Delta T$) corresponding to the increase or decrease; measure the in-period elapsed time t; and input the measured in-period elapsed time t into the automatic adjustment device 23B of the integration control device. In this case, it is also possible to input the calculated control period $\Delta T$ into the automatic adjustment device 23B. In the example illustrated, the single automatic adjustment device 23B provided in the integration control device 6 outputs the operation states of the robots provided in the system as a whole. Another possible configuration is that the upper-level controller 11 of each robot includes a dedicated automatic adjustment device, and the automatic adjustment devices perform cooperative control while synchronizing time lengths 4T. In this case, each upper-level controller 11 itself is capable of calculating the in-period elapsed time t and the load ratio and inputting the in-period elapsed time t and the load ratio directly into the automatic adjustment device 23B. As a result, real-time performance of processing improves.

8-3: Automatic Adjustment of Work Command

Figure 10:
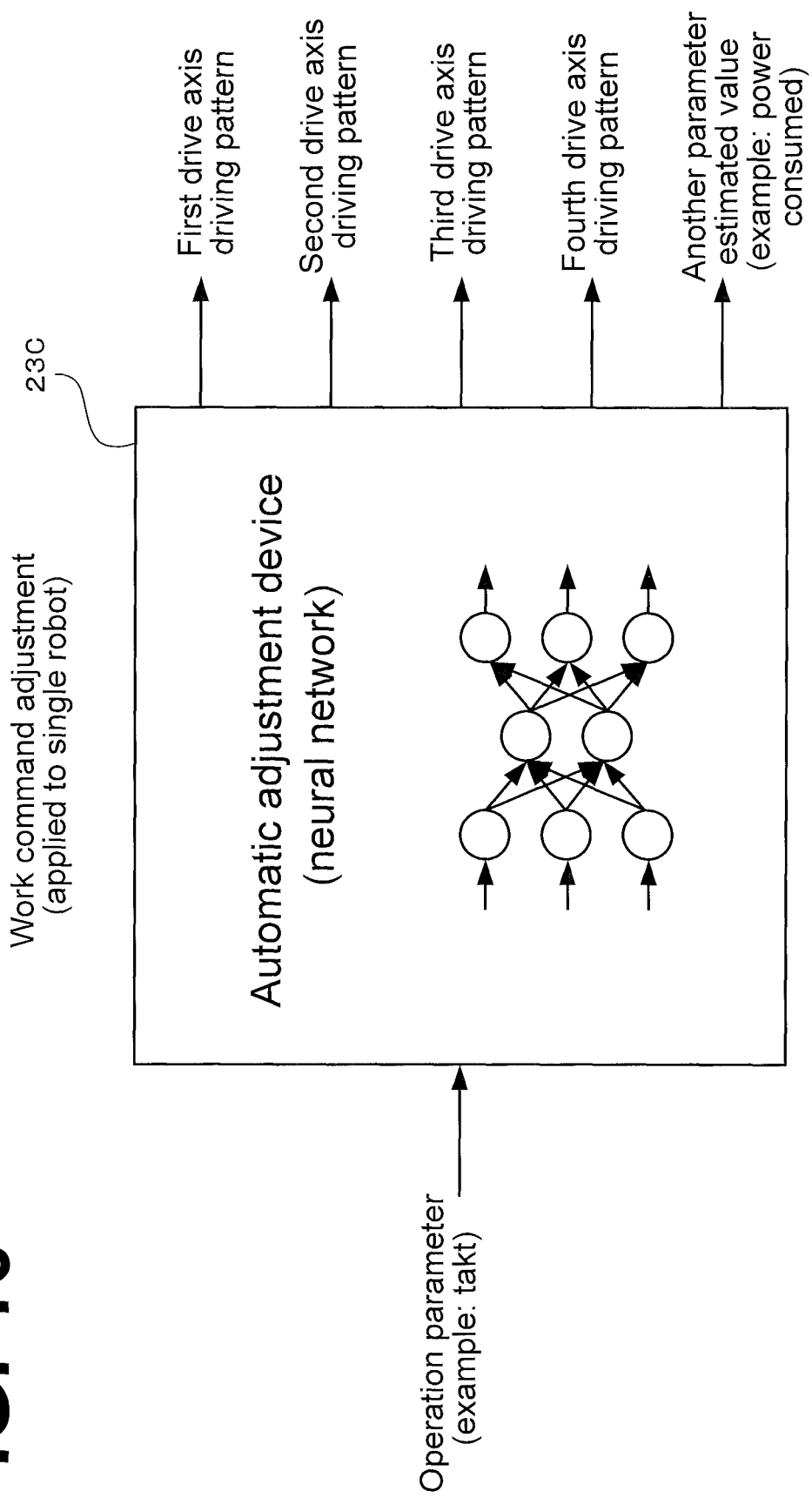
FIG. 10 is an example conceptual model configuration of an automatic adjustment device that adjusts a driving pattern of a work command based on a learning content obtained by deep learning using a neural network.

FIG. 10 is an example conceptual model configuration of the automatic adjustment device 23C, which adjusts a driving pattern of a work command based on a learning content obtained by deep learning using a neural network. In this case, the automatic adjustment device 23C is designed and adjusted to, in response to a setting input of an operation parameter, output the driving pattern of each motor 14 provided in a corresponding robot. That is, the neural network of the automatic adjustment device 23C learns a feature quantity indicating a correlation between an operation parameter value and the driving pattern of each motor 14. It is to be noted that as in the example illustrated, it is possible to make the automatic adjustment device 23 learn to output an estimated value of another operation parameter.

8-4: Specific Example of Automatic Adjustment of Work Command

Figure 11:
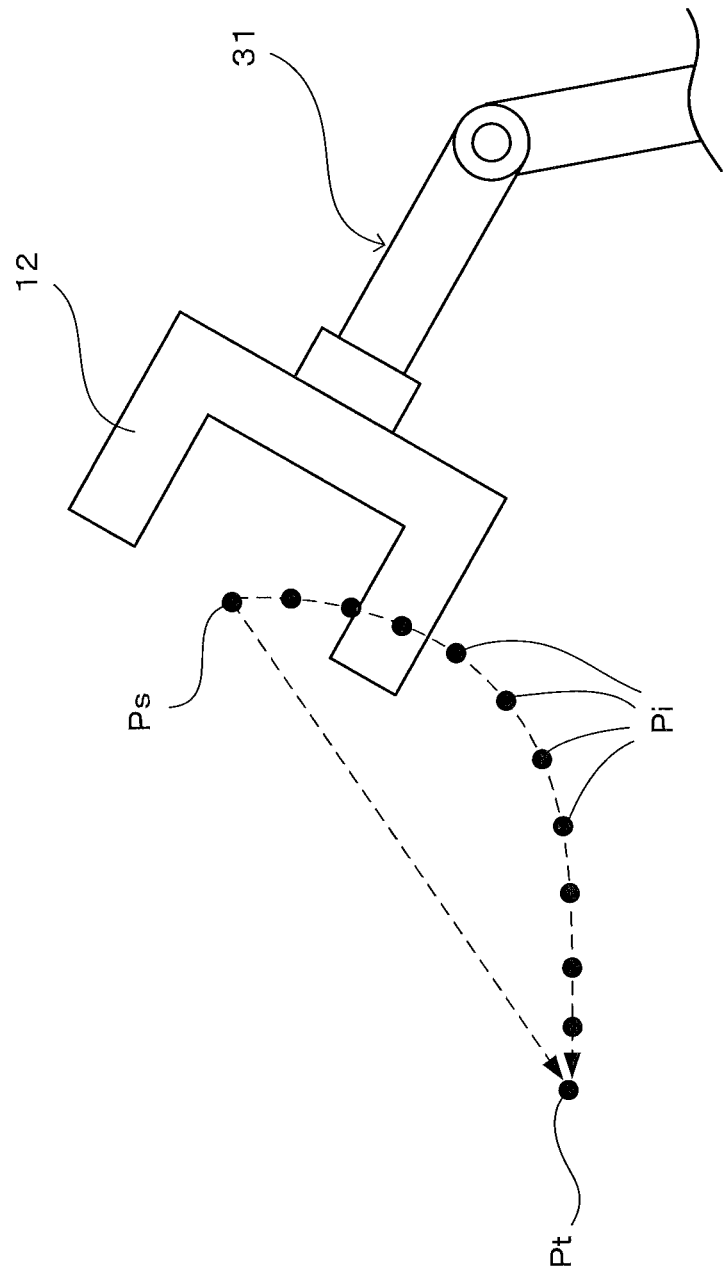
FIG. 11 illustrates how a suitable movement path of a robot varies depending on an operation parameter.

The automatic adjustment device 23C, which adjusts work commands, is illustrated in FIG. 10 in the form of a schematic representation of input and output of information. There are, however, a variety of possible configurations in which the automatic adjustment device 23C can be embodied. For example, as illustrated in FIG. 11, when the end effector 12 of a vertical articulated robot 31 is moved from a present position Ps to a destination position Pt, using a linear path between these two points makes the necessary arrival time (tact time) shortest. When, however, some other alternative path is used to move the end effector 12, it is possible that power consumption is reduced. In light of this, the automatic adjustment device 23, which adjusts work commands, may successively estimate and output halfway positions Pi. Each of the halfway positions Pi is a position estimated as suitable at each point of time for implementation of an operation parameter in the vicinity of the present position Ps. It is to be noted that while FIG. 11 only illustrates movement positions of the end effector 12, if the vertical articulated robot 31 has a large number of drive axes, it is necessary to consider postures of the end effector 12 as well.

Figure 12:
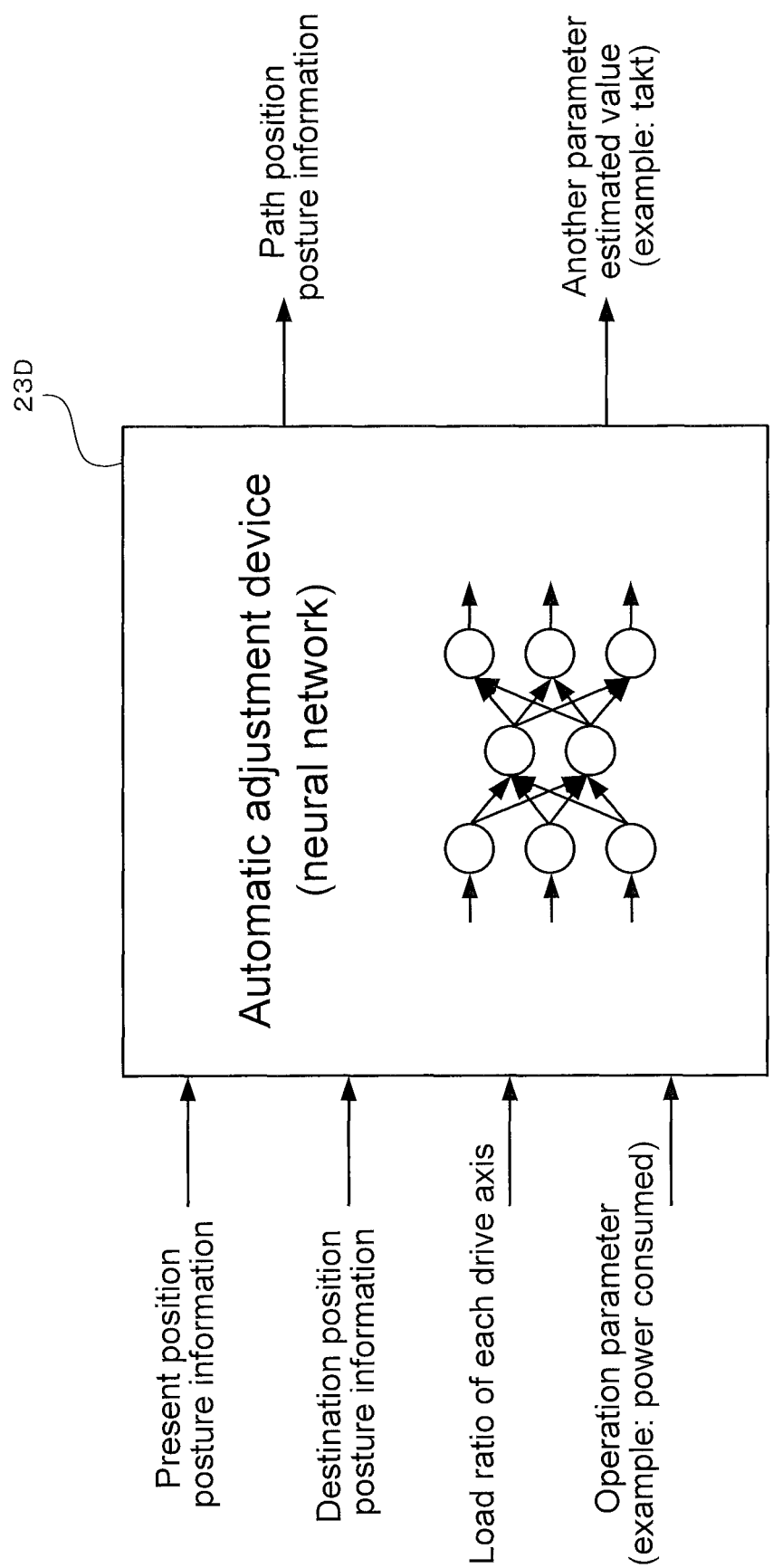
FIG. 12 illustrates an example model configuration of an automatic adjustment device that adjusts a movement path for a different work command.

A specific example model configuration of an automatic adjustment device 23D in this case is illustrated in FIG. 12. In the example illustrated, the automatic adjustment device 23D is designed and adjusted to, in response to present position posture information, destination position posture information, and an operation parameter that have been input at a point of time, output path position posture information (corresponding to the driving pattern in FIG. 10) estimated as suitable in the vicinity of the present position posture information. It is to be noted that the present position posture information, the destination position posture information, and the path position posture information are information indicating the position and posture of the end effector 12, and that these pieces of information may be defined by a coordinate position or a vector in a robot coordinate system (not illustrated) that is specially set, or may be defined by an output position of each motor 14 (angular position detected by an encoder (not illustrated) provided in the motor).

It is to be noted that the load ratios of the motors 14 may be input into the automatic adjustment device 23D, which adjusts work commands. This ensures that a real-time output further improved in estimation accuracy can be made. In the example illustrated, the integration control device 6 includes the automatic adjustment device 23D for each of the robots. Another possible configuration is that the upper-level controller 11 of each robot includes an automatic adjustment device so that the automatic adjustment devices perform cooperative control in a synchronized manner. In this case, each upper-level controller 11 itself is capable of calculating the present position posture information, the destination position posture information, the path position posture information, and the load ratio, and inputting these pieces of information directly into the automatic adjustment device 23D. As a result, real-time performance of processing improves.

The above-described automatic adjustment devices 23A to 23D estimate and output an operation sequence and a work command corresponding to a setting input of an operation parameter value. The automatic adjustment device 23, however, may be specialized in estimation of a most suitable output (optimization of an output). In this case, the input of an operation parameter value is not necessary.

It is to be noted that the processing algorithm of the automatic adjustment device 23 may be implemented by other than deep learning using a neural network illustrated in the drawings; it is possible to use another processing algorithm (not illustrated) using, for example, support vector machine or Bayesian network.

9: Advantageous Effects of this Embodiment

As has been described hereinbefore, the mechanical equipment control system 1 according to this embodiment includes: the load ratio detection circuit 35, which detects load ratios of all the motors 14 and all the servo amplifiers 13; the manipulation device 21, which receives a setting input of a predetermined operation parameter for the mechanical equipment control system 1; and the integration control device 6, which controls a plurality of robots based on the setting input of the operation parameter while keeping all the load ratios at an allowable load state.

Thus, by keeping the load ratios of all the motors 14 of the mechanical equipment at an allowable load state, the integration control device 6 is able to, while keeping an operation task of the mechanical equipment as a whole at an accomplished state, control the robots by performing an inter-robot operation sequence adjustment and/or an inter-robot load-ratio assignment adjustment that are suitable for the setting input of the predetermined operation parameter. This configuration, as a result, improves the operability of the mechanical equipment. It is to be noted that a setting input of an operation parameter may not necessarily be performed manually at the manipulation device 21 but may be performed by, for example, receiving a setting input from another controller via a communication interface.

Also in this embodiment, each of the robots includes the servo amplifier 13, the internal sensors 36, and the external sensors 40. Based on environment state data and/or motion state data detected by the sensors 36 and 40, the load ratio detection circuit 35 calculates, as a load ratio, a motion margin (motion state value/motion rated value) of at least one of the motor 14 and the servo amplifier 13.

This configuration eliminates the need for relying on rated values of state data of the motor 14 and the servo amplifier 13 (the rated values correspond to state data conditions that are set on the manufacturer side and that ensure normal motions if all the conditions are satisfied simultaneously). Instead, a load ratio is calculated based on a motion margin represented by a ratio between: a motion rated value that is a combination of the state data and equivalent to a maximum limitation value of the functional potential of the motor 14 and the servo amplifier 13; and a motion state value that is indicated by a scale of measurement identical to that used for the motion rated value and that is equivalent to a functional potential value at the present point of time. Then, monitoring is performed as to whether the load ratio is at an allowable load state. It is to be noted that the load ratio detection circuit 35 may be provided in the integration control device 6. In this case, various kinds of state data detected by the servo amplifier 13 is output to the integration control device 6, and the integration control device 6 calculates a load ratio for each pair of motor 14 and servo amplifier 13 corresponding to the integration control device 6.

Also in this embodiment, the integration control device 6 includes: the display 22 (load ratio monitor display area), which displays the load ratios of all the motors 14 (=motion margin=motion state value/motion rated value); and the manual adjustment device 24, which receives a setting input of a robot control adjustment from the administrator. This configuration ensures that control of the robots can be adjusted by making an adjustment intended by a user while keeping the load ratio in check.

Also in this embodiment, the integration control device 6 includes the automatic adjustment device 23, which controls adjustment of a plurality of robots based on the setting input of the predetermined operation parameter. This eliminates the need for a manual adjustment by the user and enables the integration control device 6 to automatically control adjustment of the robots, resulting in improved operability. It is to be noted that in this embodiment, the administrator arbitrarily manually selects whether to perform a control adjustment in the automatic adjustment mode or the manual adjustment mode. This configuration, however, is not intended in a limiting sense. For example, the integration control device 6 may autonomously (automatically) switch to the automatic adjustment mode based on various other setting conditions.

Also in this embodiment, the automatic adjustment device 23 makes an adjustment of a time-series sequence of an operation state of each of the robots based on the setting input of the predetermined operation parameter. This ensures that the mechanical equipment can be controlled using an operation sequence that enables the functional potential of each single robot to be exerted to a maximum based on the content of the setting input of the operation parameter.

Also in this embodiment, the automatic adjustment device 23 makes an adjustment of load assignment in each robot on a single motor 14 basis based on the setting input of the predetermined operation parameter. This ensures that the plurality of motors 14 provided in a single robot can be cooperatively controlled based on the content of the setting input of the operation parameter so that the functional potential of each motor 14 is exerted to a maximum.

Also in this embodiment, the automatic adjustment device 23 performs control adjustment based on a mathematical model. This ensures that an adjustment can be made by a method acquainted with in advance, making operations such as correction easily performable.

Also in this embodiment, the automatic adjustment devices 23A and 23B perform a control adjustment based on a learning content obtained in a machine learning process. This ensures a highly accurate adjustment without relying on how a mathematical model, which is an artificial model, is designed, even if the robots and the mechanical equipment as a whole are complicated in configuration and adjustment content is complicated accordingly.

As used herein, the term "perpendicular" means substantially or approximately perpendicular within some design tolerance or manufacturing tolerance, as well as precisely perpendicular. As used herein, the term "parallel" means substantially or approximately parallel within some design tolerance or manufacturing tolerance, as well as precisely parallel. As used herein, the term "planar" means substantially or approximately planar within some design tolerance or manufacturing tolerance, as well as precisely planar.

Also, when the terms "identical", "same", "equivalent", and "different" are used in the context of dimensions, magnitudes, sizes, or positions, these terms may not necessarily mean "identical", "same", "equivalent", and "different", respectively, in a strict sense. Specifically, the terms "identical", "same", "equivalent", and "different" are intended to mean "substantially or approximately identical", "substantially or approximately same", "substantially or approximately equivalent", and "substantially or approximately different", respectively, within some design tolerance or manufacturing tolerance.

Also, the term "comprise" and its variations are intended to mean open-ended terms, not excluding any other elements and/or components that are not recited herein. The same applies to the terms "include", "have", and their variations.

Also, a component suffixed with a term such as "member", "portion", "part", "element", "body", and "structure" is intended to mean that there is a single such component or a plurality of such components.

Also, ordinal terms such as "first" and "second" are merely used for distinguishing purposes and there is no other intention (such as to connote a particular order) in using ordinal terms. For example, the mere use of "first element" does not connote the existence of "second element"; otherwise, the mere use of "second element" does not connote the existence of "first element".

Also, approximating language such as "approximately", "about", and "substantially" may be applied to modify any quantitative representation that could permissibly vary without a significant change in the final result obtained. All of the quantitative representations recited in the present application shall be construed to be modified by approximating language such as "approximately", "about", and "substantially".

Otherwise, the above-described embodiments and modifications may be combined in any manner deemed suitable.

Obviously, numerous modifications and variations of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A mechanical equipment control system comprising:
   mechanical equipment including a plurality of mechanical apparatuses configured to be controlled based on an operation parameter for the mechanical equipment, each of the plurality of mechanical apparatuses comprising:
   a motor which is configured to drive each of the plurality of mechanical apparatuses;
   a motor controller configured to drive the motor; and
   a sensor configured to detect a state value of at least one of the motor and the motor controller;
   a load ratio detection circuit configured to calculate, as a load ratio, a motion margin of the at least one of the motor and the motor controller based on the state value; and
   an integration control circuit configured to control the plurality of mechanical apparatuses based on the operation parameter for the mechanical equipment while keeping the load ratio in an allowable load state.

2. The mechanical equipment control system according to claim 1, wherein the integration control circuit comprises a load ratio display configured to display the load ratio of the motor, and a manual adjustment circuit configured to receive a setting input for adjusting control of the plurality of mechanical apparatuses.

3. The mechanical equipment control system according to claim 1, wherein the integration control circuit comprises an automatic adjustment circuit configured to make an adjustment of control of the plurality of mechanical apparatuses based on the operation parameter.

4. The mechanical equipment control system according to claim 3, wherein the automatic adjustment circuit is configured to make an adjustment of a time-series sequence of an operation state of the plurality of mechanical apparatuses based on the operation parameter.

5. The mechanical equipment control system according to claim 3, wherein the automatic adjustment circuit is configured to make an adjustment of a load on the motor in the plurality of mechanical apparatuses based on the operation parameter.

6. The mechanical equipment control system according to claim 3, wherein the automatic adjustment circuit is configured to make the adjustment based on a mathematical model.

7. The mechanical equipment control system according to claim 3, wherein the automatic adjustment circuit is configured to make the adjustment based on a learning content obtained in a machine learning process.

8. The mechanical equipment control system according to claim 1, wherein the integration control circuit comprises a load ratio display configured to display the load ratio of the motor, and a manual adjustment circuit configured to receive a setting input for adjusting control of the plurality of mechanical apparatuses.

9. The mechanical equipment control system according to claim 1, wherein the integration control circuit comprises an automatic adjustment circuit configured to make an adjustment of control of the plurality of mechanical apparatuses based on the operation parameter.

10. The mechanical equipment control system according to claim 9, wherein the automatic adjustment circuit is configured to make an adjustment of a time-series sequence of an operation state of the plurality of mechanical apparatuses based on the operation parameter.

11. The mechanical equipment control system according to claim 4, wherein the automatic adjustment circuit is configured to make an adjustment of a load on the motor in the plurality of mechanical apparatuses based on the operation parameter.

12. The mechanical equipment control system according to claim 9, wherein the automatic adjustment circuit is configured to make an adjustment of a load on the motor in the plurality of mechanical apparatuses based on the operation parameter.

13. The mechanical equipment control system according to claim 10, wherein the automatic adjustment circuit is configured to make an adjustment of a load on the motor in the plurality of mechanical apparatuses based on the operation parameter.

14. The mechanical equipment control system according to claim 4, wherein the automatic adjustment circuit is configured to make the adjustment based on a mathematical model.

15. The mechanical equipment control system according to claim 5, wherein the automatic adjustment circuit is configured to make the adjustment based on a mathematical model.

16. The mechanical equipment control system according to claim 10, wherein the automatic adjustment circuit is configured to make the adjustment based on a mathematical model.

17. The mechanical equipment control system according to claim 1, further comprising:

an input receiving circuit configured to receive the operation parameter which is input into the mechanical equipment control system.

18. A control apparatus for mechanical equipment including a plurality of mechanical apparatuses each having a motor, the control apparatus comprising:

a motor controller configured to drive the motor;

a sensor configured to detect a state value of at least one of the motor and the motor controller;

a load ratio detection circuit configured to calculate, as a load ratio, a motion margin of the at least one of the motor and the motor controller based on the state value; and an integration control circuit configured to control the plurality of mechanical apparatuses based on the operation parameter for the mechanical equipment while keeping the load ratio in an allowable load state.

19. A method for controlling mechanical equipment including a plurality of mechanical apparatuses each including at least one motor, the method comprising:

controlling a motor controller to control the at least one motor to move each of the plurality of mechanical apparatuses of mechanical equipment based on an operation parameter for the mechanical equipment while keeping a load ratio in an allowable load state;

detecting a state value of at least one of the motor controller and the at least one motor; and calculating, as the load ratio, a motion margin of the at least one of the motor controller and the at least one motor based on the state value.

* * * * *